J. J. WINSOR.
Nut-Lock.
No. 195,912.   Patented Oct. 9, 1877.
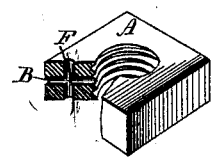
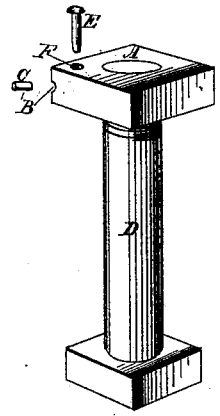

UNITED STATES PATENT OFFICE.

JOHN J. WINSOR, OF EAST SAGINAW, MICHIGAN.

IMPROVEMENT IN NUT-LOCKS.

Specification forming part of Letters Patent No. 195,912, dated October 9, 1877; application filed April 7, 1877.

*To all whom it may concern:*

Be it known that I, JOHN J. WINSOR, of East Saginaw, in the county of Saginaw and State of Michigan, have invented a lock for nuts to bolts, called a "Nut-Lock," of which the following is a specification:

The object I have in view is to provide a device by which I can put a nut on a bolt provided with mechanism that will hold the nut in its place until taken off by hand.

Figure 1 is a perspective view, with part of the nut broken away. Fig. 2 is a perspective view of the bolt in full.

The device proper is composed of nut A, with a round or square hole or slot, B, running horizontally through the corner of nut A, with a round or square dog, C, inserted from the outside, and forced into the thread on bolt D by a smooth round key, E, in a smooth hole or slot, F, running perpendicularly through the corner of nut A.

What I claim as new and my invention, and want to secure by Letters Patent, is—

The combination of the nut A, having the slot B through it, and the transverse slot F, communicating with slot B, with the dog C and the key E, substantially as and for the purpose set forth.

JOHN J. WINSOR.

Witnesses:
CHARLES E. MILLER,
JOHN HANEY.